(12) United States Patent
Mannheim Astete et al.

(10) Patent No.: US 9,623,634 B2
(45) Date of Patent: Apr. 18, 2017

(54) OBSCURATION HAVING SUPERIOR STRENGTH AND OPTICAL QUALITY FOR A LAMINATED AUTOMOTIVE WINDSHIELD

(71) Applicant: AGP America S.A., Bogota (CO)

(72) Inventors: Arturo Mannheim Astete, Lima (PE); Vincenzo Mannino, Lima (PE); Charles S. Voeltzel, New Kensington, PA (US)

(73) Assignee: AGP AMERICA S.A., Panama (PA)

( * ) Notice: Subject to any disclaimer, the term of this patent is extended or adjusted under 35 U.S.C. 154(b) by 73 days.

(21) Appl. No.: 14/625,952

(22) Filed: Feb. 19, 2015

(65) Prior Publication Data
US 2016/0243796 A1    Aug. 25, 2016

(51) Int. Cl.
*B32B 17/10* (2006.01)
*B60J 1/02* (2006.01)

(52) U.S. Cl.
CPC .... *B32B 17/10348* (2013.01); *B32B 17/1077* (2013.01); *B32B 17/10651* (2013.01); *B60J 1/02* (2013.01); *B32B 2250/03* (2013.01); *B32B 2255/10* (2013.01); *B32B 2307/41* (2013.01); *B32B 2307/412* (2013.01); *B32B 2605/006* (2013.01)

(58) Field of Classification Search
CPC .......................... H01J 2237/20264; B60J 1/02
See application file for complete search history.

(56) References Cited

U.S. PATENT DOCUMENTS

| | | | |
|---|---|---|---|
| 7,232,213 B2 | 6/2007 | Smith et al. | |
| 7,278,730 B2 | 10/2007 | Elwakil | |
| 8,002,938 B2 | 8/2011 | Elwakil et al. | |
| 2007/0029026 A1* | 2/2007 | Bolognese | B29C 51/36 156/99 |
| 2008/0286542 A1* | 11/2008 | Hayes et al. | 428/213 |
| 2013/0258436 A1* | 10/2013 | Podbelski | G02F 1/157 359/265 |

FOREIGN PATENT DOCUMENTS

DE    10 2011 004 500 A1    8/2012

* cited by examiner

*Primary Examiner* — Ian Rummel
(74) *Attorney, Agent, or Firm* — Jacobson Holman, PLLC.

(57) ABSTRACT

Laminated automotive glazing including plastic layers and glass having an obscuration area produced by printing on the plastic layers of the laminate rather than printing and firing a black enamel frit onto the glass. This results in an obscuration having superior optical quality, higher strength and a lower probability of breakage as compared to a black enamel frit obscuration.

9 Claims, 9 Drawing Sheets

OBSCURATION HAVING SUPERIOR STRENGTH AND OPTICAL QUALITY FOR A LAMINATED AUTOMOTIVE WINDSHIELD

FIELD OF THE INVENTION

The presently disclosed invention is directed to the use of an interlayer printing process to create a laminated automotive glazing having an obscuration that has superior strength and optical quality.

BACKGROUND OF THE INVENTION

Black enamel frit obscurations are commonly applied to automotive glazing. The practice of applying black enamel frit obscurations became common place the 1980s when the industry switched from the rubber H channel and the butyl adhesive strip windshield mounting systems to polyurethane adhesive. This change was made in response to the poor safety performance of the prior technology. The channel/butyl mounted windshields were often dislodged on impact allowing the occupants to be ejected from the vehicle. To improve occupant retention in crashes, the industry to switched to polyurethane adhesive mounting. Today, on new vehicles, butyl is no longer used and rubber H channel mount is only seen on commercial and off-road vehicles.

One advantage of the butyl strip system was that the butyl strip was narrow enough to be covered with a molding or trim strip to obscure the butyl and the mounting flange. The rubber channel also did not require an obscuration as the rubber covered both the edge of glass and the flange.

This had to change to enable the use of polyurethane. To get the required strength, it was found that the bead of polyurethane had to be substantially wider than the butyl strip had been. With a minimum width of 19 mm, it was no longer practical to obscure the adhesive from view from the outside with a trim strip or molding due to the width that would have been required. In addition, polyurethane needs to be protected from ultra-violet light, UV, to prevent degradation. As a result, the black enamel frit band was added to the glass, to obscure the view of the polyurethane and to protect the polyurethane by blocking the UV. This obscuration band of black enamel frit is commonly called the "black band".

While there can be no doubt that the polyurethane system has saved countless lives, it comes at price.

Black enamel frit is comprised of pigments, a carrier, binders and finely ground glass. Other materials are also sometimes added to enhance certain properties: the firing temperate, anti-stick, chemical resistance, etc. The frit is applied to the glass using a silk screen or ink jet printer prior to heating and bending. During the bending process, the ground glass soften and fuses with the glass surface. The frit is said to be "fired" when this takes place. This is very similar to the process used to apply enamel finishes on bathroom fixtures and appliances.

Metals and many other types of materials have an ultimate yield strength specified at which the material will always fail. However, with glass we can only specify a probability of breakage for a given value of stress. Looking at glass at the molecular level, we would expect the strength to be very high. In fact, what we find in practice is that glass has a very high compressive strength, as expected, but very low tensile strength.

For a given set of identical glass specimens, if each is flexed to the point of breakage, the breaking point might appear to be a random variable. In fact, the yield point follows a Weibull distribution and the probability of breakage can be calculated from the test data as a function of stress, duration, area, surface defects and the modulus of glass.

To the naked eye, float glass appears to be near perfect. Any defects that may be present are so small as to not be visible to the naked eye. But, in fact, at the microscopic level, the surface can be seen to be rough and dotted with flaws. When the glass is placed in tension, these surface defects tend to open up and expand, eventually leading to breakage and failure. Therefore, glass always fails in tension. Even when not placed in tension, the surface defects will react with moisture and slowly "grow" over time. This phenomenon is known as slow crack growth.

For these reasons, it is desirable to minimize any damage to the surface during handling and processing and to also minimize any residual stress in the glass.

A fired black frit increases surface defects. This can be seen if the black pigment of a fired black band is chemically dissolved. The surface of glass will have a frosted appearance, similar to sand blasted or chemically etched glass. The frosted appearance is due to the myriad surface defects present from the fused glass. This makes the surface weaker increasing the probability of breakage.

Another problem arises from the thermal gradient that results from the black frit during the bending process. As one would expect, the black frit absorbs heat better than clear glass. The painted area tends to run hotter than the adjacent clear areas. The abrupt thermal gradient on the surface, going from the black to the clear area of the glass, results in optical distortion along the inner edge of the black band. This is known as the "burn" line in the industry.

One method used to address the burn line problem is the dot fadeout. Starting at the inner solid edge of the black paint, rows of increasingly smaller dots are painted on the glass. This is the same principle as used in grayscale printing. This reduces the rate of change in the surface temperature, spreading the gradient over a wider area and reducing the rate of change. The dot fadeout also hides the distortion. However, on some parts, even a wide dot fadeout is not sufficient to eliminate all distortion. A wide dot fadeout also may not be allowed depending upon the size of the opening and the regulatory requirements for driver vision.

In addition, the black frit interferes with the annealing process. Windshield glass must be annealed to meet safety requirements. Glass is annealed by heating the glass to a temperature in the glass transition range to soften it, letting it soak for some period of time to allow any stress to be relieved, and then slowly cooling through the glass transition range until the glass freezes. The hotter black tends to freeze after the cooler clear portion resulting in residual stress in the laminate.

Another problem caused by the black frit is surface mis-match. A laminate is comprised of at least two layers of glass. The frit is typically applied to only one of the glass layers. This can result is a slight difference in the shape of the surfaces. When the two surfaces are forced together during lamination, the mis-match results in residual stress in the laminate.

The area of the windshield with a black frit obscuration has increased in recent years.

Figure 1:
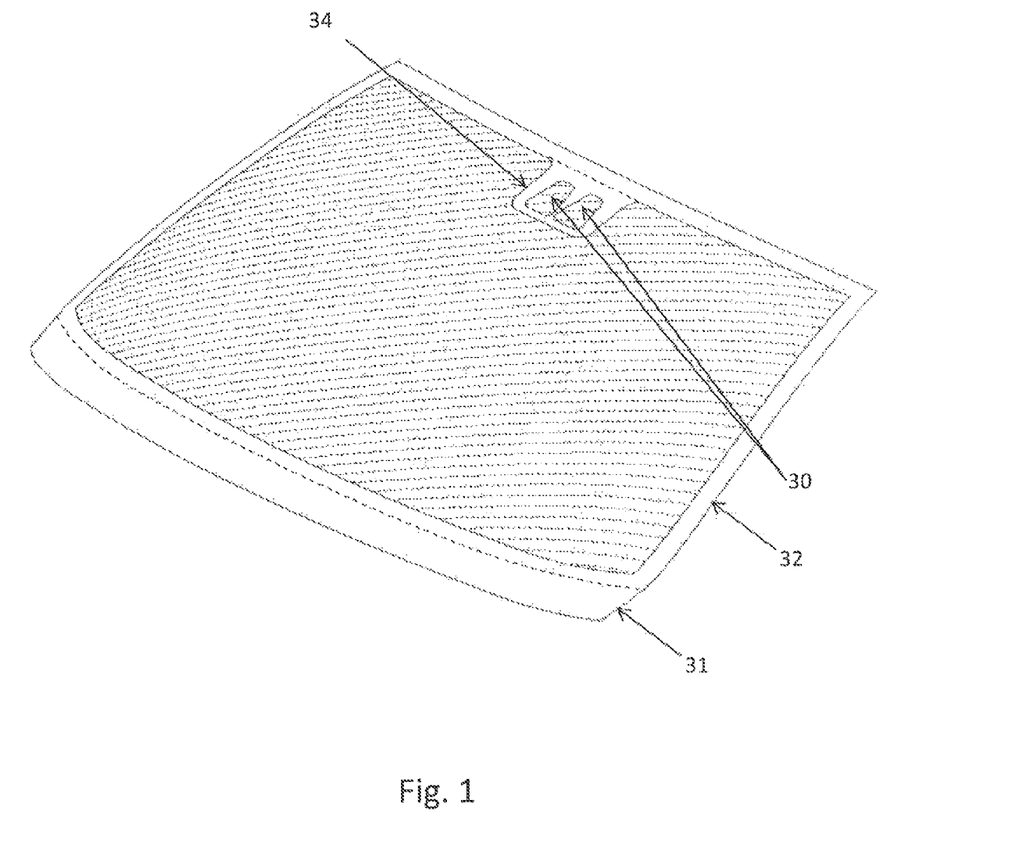
FIG. 1 shows a typical automotive windshield with a black band obscuration 32, a wiper rest obscuration 31 and an equipment obscuration 34 extending downward from the black band obscuration, having openings 30 to provide a forward field of view for two cameras.
Figure 2:
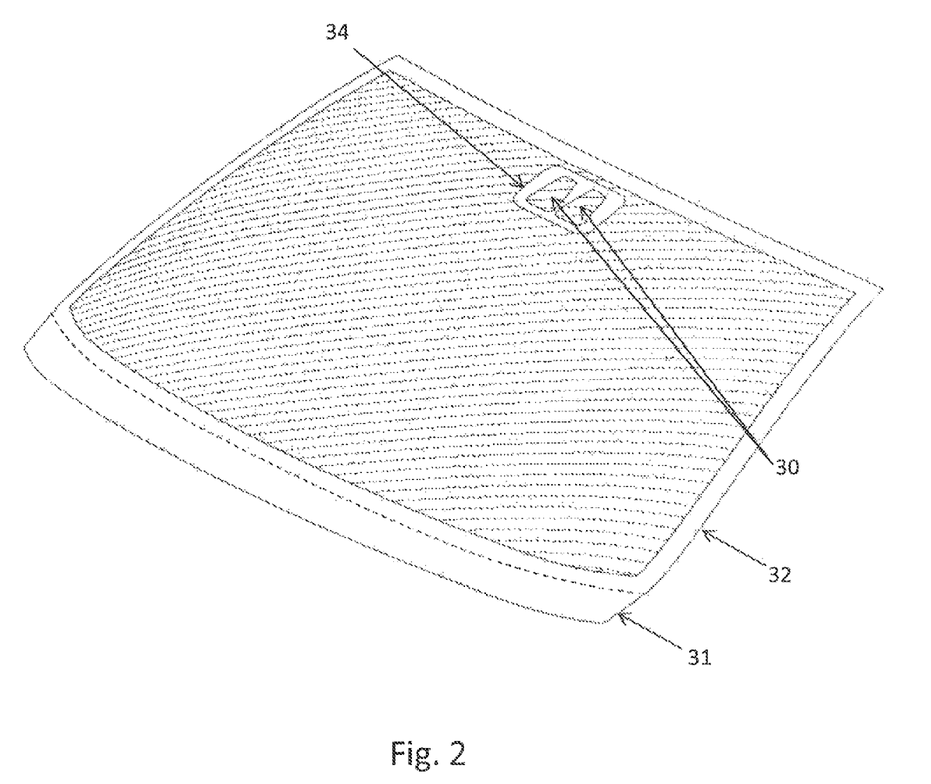
FIG. 2 shows an automotive windshield with a black band 32, a wiper rest obscuration 31 and an obscuration 34 separated from the black band, having openings 30 to provide a forward field of view for two cameras.
Figure 3:
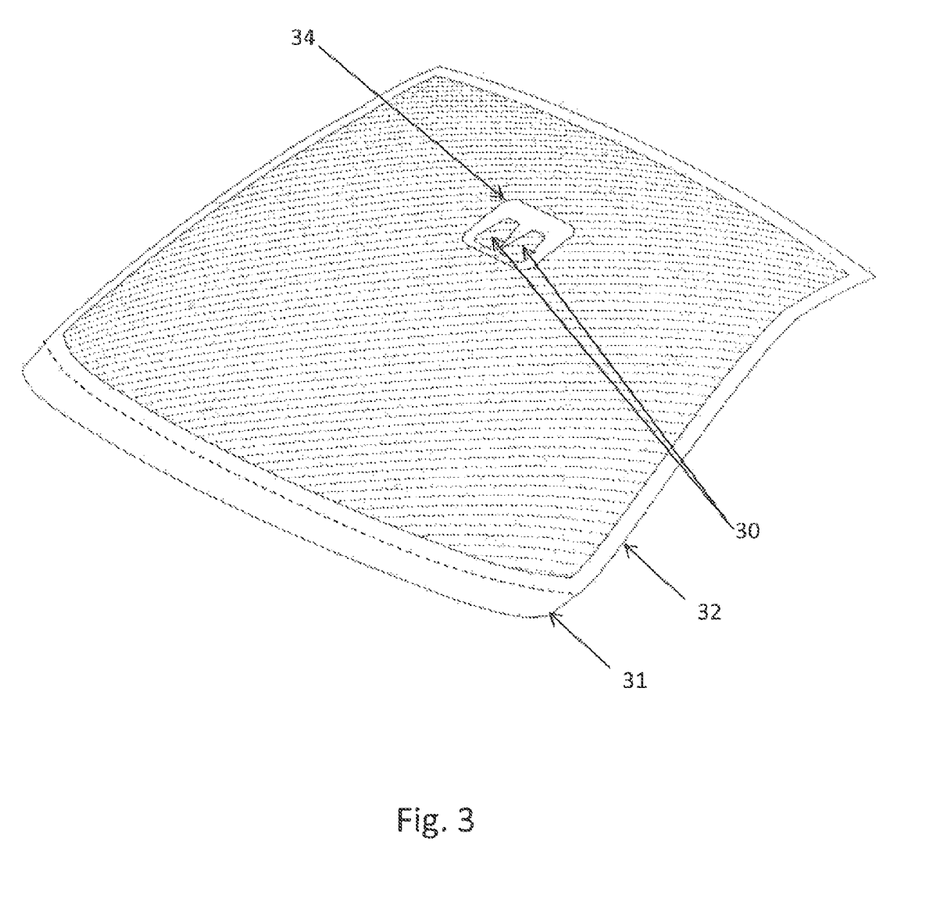
FIG. 3 shows a panoramic automotive windshield with a black band 32, a wiper rest obscuration 31 and an obscuration 34 separated from the black band, having openings 30 to provide a forward field of view for two cameras.
Figure 4:
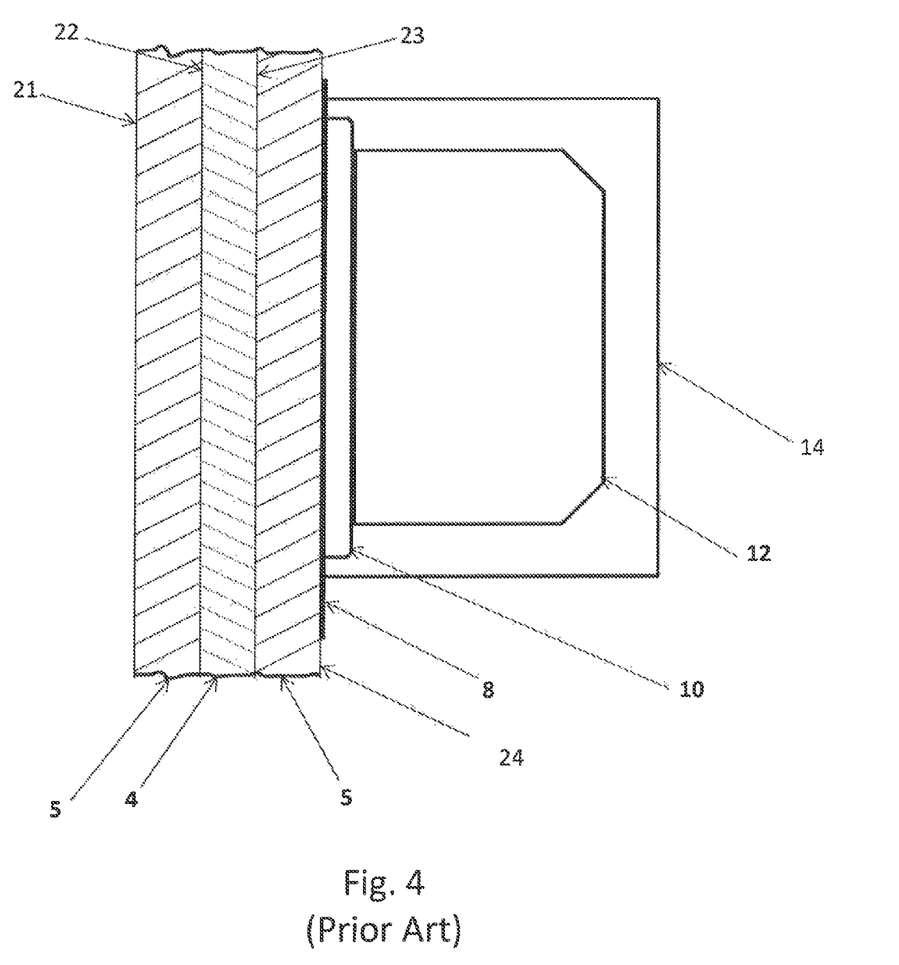
FIG. 4 shows the obscuration 8 of the prior art, a black enamel frit applied to the fourth surface 24.

To improve aerodynamics and lower wind noise, the wiper rest position on many vehicles is located out of sight below the hood line. When this is done, the bottom edge of the windshield is extended to form a wiper rest 31 so as to provide a smooth transition resting surface for the wipers when not in use as shown in FIGS. 1, 2 and 3. This area is typically obscured with a black enamel frit 32 extending downward and connecting to the black band. The width of this area can be in excess of 15 cm. This area is also normally heated, to prevent snow and ice from building up, using a screen print conductive silver on the fourth surface of the glass 24. The power density required to keep this area free of ice and snow is often double that of a rear window defroster due to the snow and ice that is packed in from the wiper action. The wide wiper rest frit obscuration, with drawbacks intrinsic to frit, coupled with the thermal stress of melting snow and ice, leads to a high breakage rate.

As the electronic content of modern vehicles has increased, the area of the windshield, near the top center, has become increasingly crowded on many vehicles. Once the province of just the rear-view mirror, we now find a wide array of equipment mounted in this location.

One of the first devices to compete for this area was the infra-red rain sensor used to provide for a full automatic mode of windshield wiper operation as well as other vehicle functions such as closing the sun roof and pulsing the brakes to keep the rotors dry. The rain sensor must have a lens optically coupled to the fourth surface of the windshield 24. An IR LED shines light onto the first surface. The amount of light reflected back correlates to the amount of water present on the first surface 21. The field of view of the lens must be in the area cleared by the wipers in order to function properly. Therefore, the lens is generally mounted on or near the vertical centerline near the top of the wiped area. Power and signal wiring is required for the sensor to work. In addition to the lens 10, the sensor comprises a housing 12 and a cover 14 all of which need to be hidden from view from the outside of the vehicle to avoid an unsightly cluttered appearance.

The rear view mirror itself has undergone a major transformation. Once a purely mechanical device, electro-chromic automatic dimming rear-view mirrors have become a popular option and are standard equipment on many models. The additional components required to provide this functionality make the mirror heavier and therefore require a larger footprint mounting bracket than a standard non-dimming mirror. Power also needs to be provided to the mirror. A cover is often provided to protect the cable and to hide it from the inside of the vehicle.

The rear-view mirror has further evolved as telematics driver aid systems and hands free blue-tooth interfaces have been introduced. The rear view mirror is a convention place to locate control push-buttons and microphones which require additional wires which also must be protected and covered.

The use of cameras, requiring a wide field of view and a high level of optical clarity, are also growing at a rapid rate. These typically must be mounted on the windshield in the wiper area. Initial applications were for night-vision. Today, camera based systems are used to provide a wide array of safety functions including adaptive cruise control, obstacle detection, lane departure warning and more. Many of these applications require the use of two cameras. A clear undistorted field of view, with minimal double imaging, is especially critical for camera based systems to perform as intended. It is essential for these systems to be able to quickly differentiate between objects, capture text, identify signage, and operate with minimal lighting.

While covers 14 and various styling methods can be used to obscure the components and cables from the inside, it is also required to maintain clean lines and a good aesthetic when the vehicle is viewed from the exterior.

Standard practice has been to extend the black enamel frit band 32 to create an obscuration 8 on the fourth surface 24 with openings in the obscuration 30 to provide for the required field of view as shown in FIGS. 1, 2 & 3.

When the black enamel frit band 32 is extended downward from the top center black band to create an obscuration 8 on the fourth surface 24, distortion and stress can become a major problem. This is because the black frit is extending further from the edge into the area where more heat must be applied to bend the glass. The large surface area of the obscuration increases the probability of breakage due to the surface defects and stress introduced by the frit. This is also a critical viewing area for windshield mounted cameras. If the distortion cannot be minimized, the opening for the camera must be made larger than would otherwise be required to provide an undistorted field of view.

A panoramic windshield is a windshield in which the top edge of glass has been extended to include at least a portion of the roof giving the driver a vertical field of vision of at least 45 degrees as defined by the applicable regulatory standards.

In the case of a panoramic windshield FIG. 3, the problem is even more pronounced as the obscuration 8 is located several cm from the top edge at or near the center of the windshield, the weakest point of the windshield. This is also where the highest temperatures are required to bend the glass.

A laminated windshield is comprised of two glass layers permanently bonded together by a thin plastic layer 4.

Automotive laminate interlayers and inks were commercialized in 2003. Some of the key patents include: U.S. Pat. No. 8,002,938 B2, U.S. Pat. No. 7,232,213 B2 and U.S. Pat. No. 7,278,730. To date, the primary application has been for architectural laminates, providing a means to produce vivid colors and patterns at 600 DPI that were never before possible. However, little has been done in the automotive market. DE201110004500 teaches the advantages of a printed plastic layer for use in an automotive laminate for reducing weight and providing artistic freedom to the designer.

One of the reasons why they have not been used in automotive windshields is that screen print enamel frits provides a high degree of protection from UV which is needed to protect the polyurethane used to bond the glazing to the vehicle opening. Inks printed on the interlayer do not have the opacity and UV blocking ability that the black enamel frits do.

BRIEF SUMMARY OF THE INVENTION

Having examined the drawback of using a black enamel frit to produce an obscuration, it can be appreciated that it would be desirable to produce a windshield that did not have the limitations that result from producing black enamel frit obscuration on glass.

The subject of the immediate invention is a laminated windshield with a least one of the three major obscurations identified produced by printing directly onto at least one of the surfaces of the plastic sheets comprising the laminate.

In the areas where applied, this eliminates all of the detrimental effects of the black enamel frit on the glass resulting in superior optical quality, higher strength, lower stress, and a lower probability of breakage.

Obscurations can be printed in any combination to produce a black band, wiper rest or an equipment obscuration.

If higher opacity is needed than can be obtained with a single print, multiple interlayer surfaces can be printed.

Protection of the polyurethane adhesive from UV is achieved thorough the opacity of the ink, achieved by printing on multiple layers if needed, in combination with the use of a UV blocking interlayer. Plastic interlayers for lamination of windshields are available from a number of suppliers which bloc over 99% of the UV.

The superior resolution of ink jet printing also has the added benefit of reducing the sensitivity of the obscuration to the tolerance stack of the process. Screen printing, at its best, has a resolution equivalent of 200 dpi. Due to the low resolution and propensity of silk screen to clog, the smallest practical print size is in the 0.3-0.5 mm range. The common dot fade out patterns seen on automotive glass, can be considered a low resolution grayscale. As a result, there is a sharp and clear division between the solid black and the fade out. If a component is placed over this division line, it will be visible from the outside through the spaces between the print. Therefore tight tolerances must be maintained. With an ink-jet printing process, a high resolution fadeout can be produced that appears to be continuous to the naked eye. Equipment mounted out of place will only gradually become visible as the distance from target increases.

The soda-lime glass used in windshields tends to have a light green tint due to the iron content of the glass. Various materials are added to the glass when it is formed to enhance the solar absorption of the glass in order to keep the vehicle interior cool. This solar absorbing glass is available in a variety of shades with the most common ones used being gray, green and blue. Various coatings are also in used on automotive windshield glass to reduce the solar heat load as are special plastic interlayers.

The tint of the glass composition, coatings and interlayers can have a detrimental effect on the ability of a camera to recognize traffic signals, tail lights, and other objects having a distinctive color. This limits the range of glass compositions, coatings and interlayers that can be used with safety cameras.

The inkjet process can be used to print a color correction filter directly onto the plastic layer in the camera field of vision opening the possibility of using compositions, coatings and interlayers that otherwise would not be acceptable due to their color. Likewise, the color of the entire windshield can be shifted by printing on the plastic area over the entire visible area of the windshield.

To aid in the alignment of the printed layers when assembling the laminate, the ink jet can be used to print index marks on the plastic layers.

By printing on more than one layer, the printed shapes can be designed such that a 3 dimensional effect can be created.

Various types of plastic films 17 are in common use in laminated automotive glass. These films are used to enhance the performance of the windshield. One of the most common and oldest performance films in use has a heat reflecting coating for enhancing solar load control. Others include but are not limited to performance films used to improve occupant retention, stiffen the laminate and provide for variable control of visible light transmission. To laminate these films, two layers of interlayer 4 are needed to achieve the required adhesion to the glass and to the film. An obscuration can be printed on either or both sides of the performance film. In the same manner, an obscuration 8 can be printed on either or both sides of either of both of the interlayer sheets. The can be done to increase the opacity of the obscuration or to produce various aesthetic effects including the illusion of depth.

Another benefit of the inkjet process is the ability to fine tune the optical properties of the obscuration. A near limitless range of visible colors can be produced. Properties in the non-visible portion of the spectrum can also be enhanced.

Some performance films are sensitive and degrade over time, with exposure to the UV. Additives that absorb or reflect the specific wavelengths of interest can be added to the ink to achieve targeted transmittance.

If a combination of frit and ink are used for the black band 32 and the equipment obscuration 34, any difference in the appearance between the two may be noticeable. In that case, separating the equipment obscuration 34 from the black band, as shown in FIG. 2, will improve the aesthetics. The transition line between the black band 32 and the wiper rest 31 will not generally be visible.

In addition to the benefits to the finished laminate, the elimination of the non-uniform heating and high thermal gradient present in the black frit areas increases yields through the bending process and also, due to the higher strength and lower surface mismatch, increases yields through the lamination process.

REFERENCE NUMERALS

3 Performance Plastic Layer
4 Plastic Interlayer Layer
5 Glass
8 Obscuration
10 Equipment Mounted To Glass
12 Device Housing
14 Cover
17 Film
21 First Surface Of Glass
22 Second Surface Of Glass
23 Third Surface Of Glass
24 Fourth Surface Of Glass
30 Openings In Equipment Obscuration
31 Wiper Rest Obscuration 32 Black Band Obscuration
34 Equipment Obscuration

DETAILED DESCRIPTION OF THE INVENTION

Experimental Results

Experimental results have demonstrated the remarkable magnitude of improvement of the invention and are shown in the following table (Table 1). Fracture strength is more than doubled, distortion is reduced by a factor of six and double image if reduced from 20" to 3". One should also note that all three of these parameters are critical to the operation of a safety camera.

TABLE 1

|  | Laminate w/ BEF | Laminate w/ PI |
| --- | --- | --- |
| Fracture Strength (ring-on-ring) | 60 Mpa | 115 Mpa |
| Distortion Camera window - 5 mm from the black edge) | 150 milli diopters | 25 milli diopters |
| Double image (Camera window - 5 mm from the black edge) | 20" (arc minute) | 3" (arc minute) |

BEF = Black enamel frit
PI = Printed interlayer with Clear glass

Advantages
1. Frit induced surface defects are eliminated.
2. Residual stress caused by non-uniform heating of the frit is eliminated.
3. Residual stress causing surface mis-match due to the frit is eliminated.
4. Low distortion, comparable to ordinary clear glass.
5. Low double image, comparable to ordinary clear glass.
6. Lower probability of breakage.
7. Higher yield during bending due to elimination of non-uniform heating.
8. Higher yields during lamination due to higher strength, lower residual stress and less surface mismatch.
9. The ink jet process allows printing of a high resolution fade out, reducing sensitivity to variation.
10. Reduced sensitivity to equipment placement due to grayscale capability.

TABLE 2

| # | Band | Wiper | Equipment |
| --- | --- | --- | --- |
| 1 | F | F | F |
| 2 | F | F | P |
| 3 | F | P | F |
| 4 | F | P | P |
| 5 | P | F | F |
| 6 | P | F | P |
| 7 | P | P | F |
| 8 | P | P | P |

F = Fired Frit
P = Printed Ink

Enamel frit and printed ink can both be used on the same part and in any combination that is convenient. With the three obscuration areas defined, there are eight possible combinations (#1, all black enamel frit is the prior art).

When there is a laminate with a single sheet of interlayer, an obscuration can be printed on neither, either or both surfaces. If a sheet of performance film is added, there is the option of printing on neither, either or both surfaces of either of the sheets of interlayer and likewise on neither, either or both surfaces of the performance film. As can be appreciated, if the ways to print an obscuration are combined with the seven possible ways to select the obscuration areas printed with ink, there are too many variations to enumerate although each combination could be applied to the laminates of FIGS. 1, 2 and 3 and comprise an equivalent embodiment.

Embodiment 1

Figure 5:
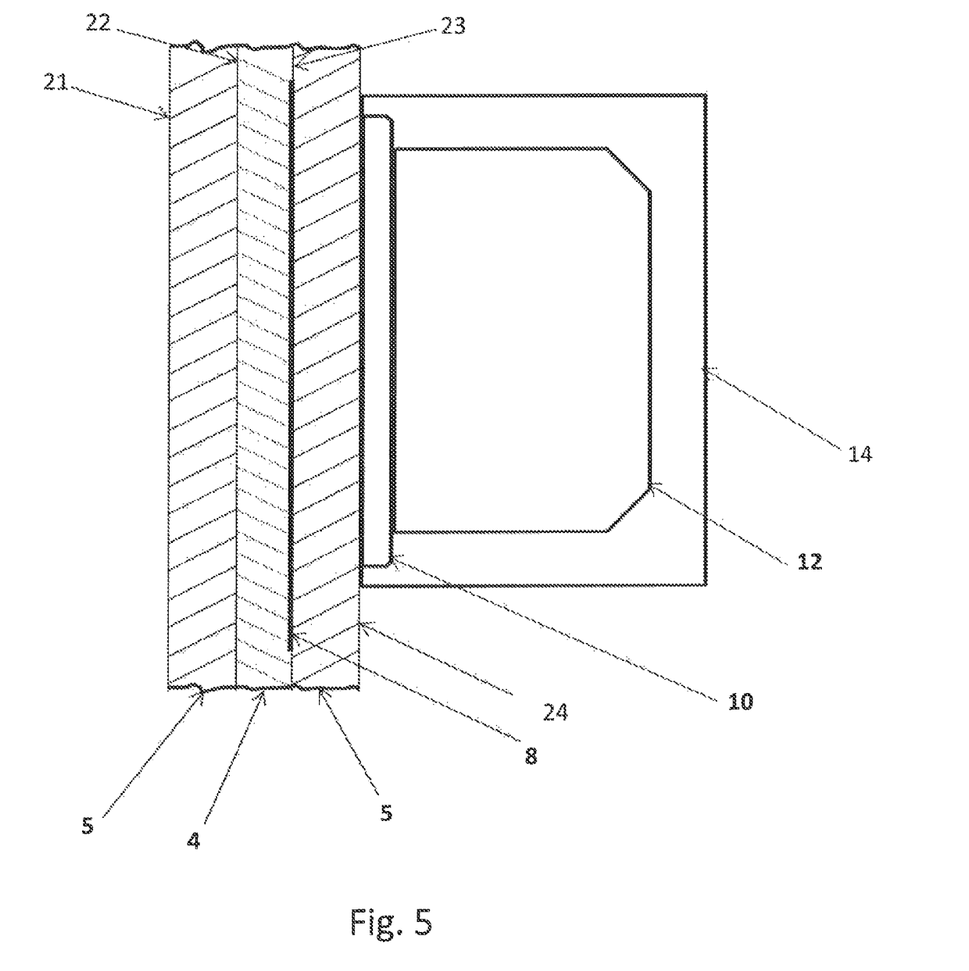
FIG. 5 shows the obscuration 8 printed on the interlayer 4 facing the third surface 23.
Figure 6:
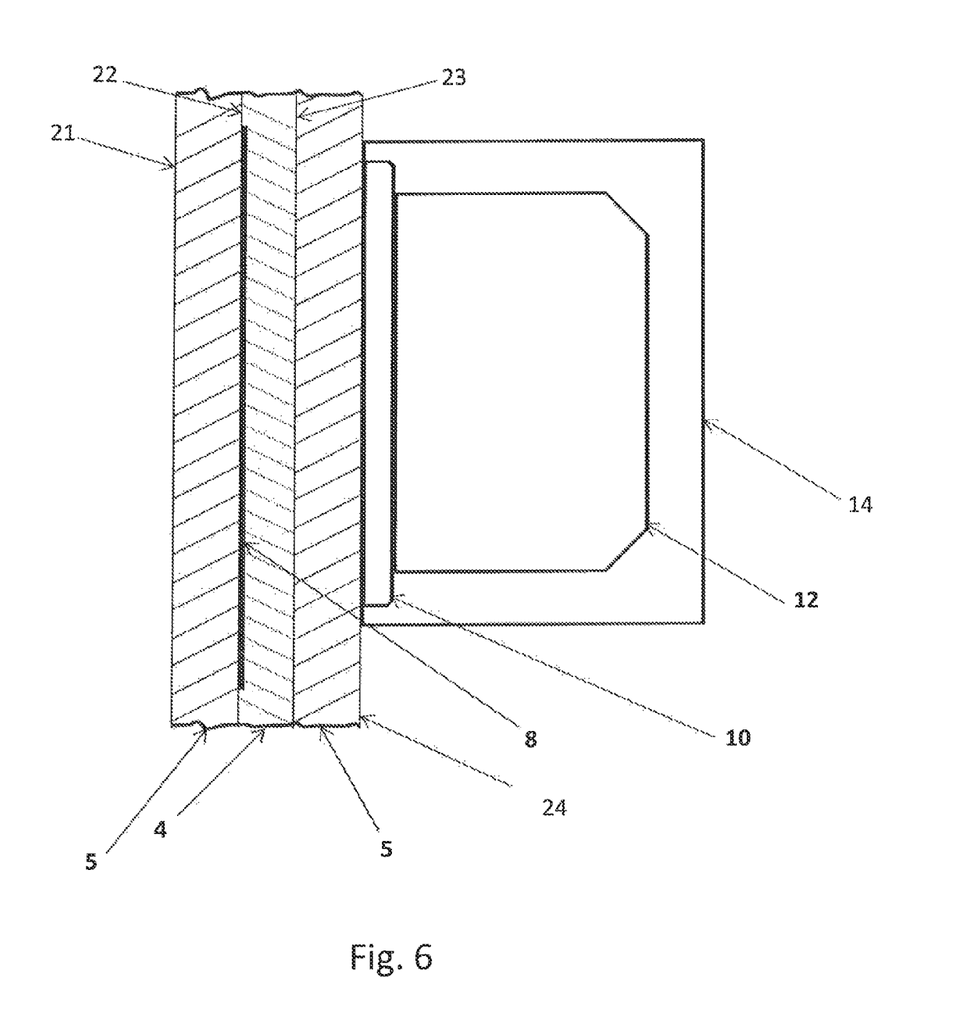
FIG. 6 shows the obscuration 8 printed on the interlayer 4 facing the second surface 22.

The windshield of FIG. 1 comprising a black enamel frit band 32, a black enamel frit wiper rest area 31 and an equipment obscuration 8, 34 printed on one surface of the interlayer (FIG. 5 and FIG. 6).

Embodiment 2

Figure 7:
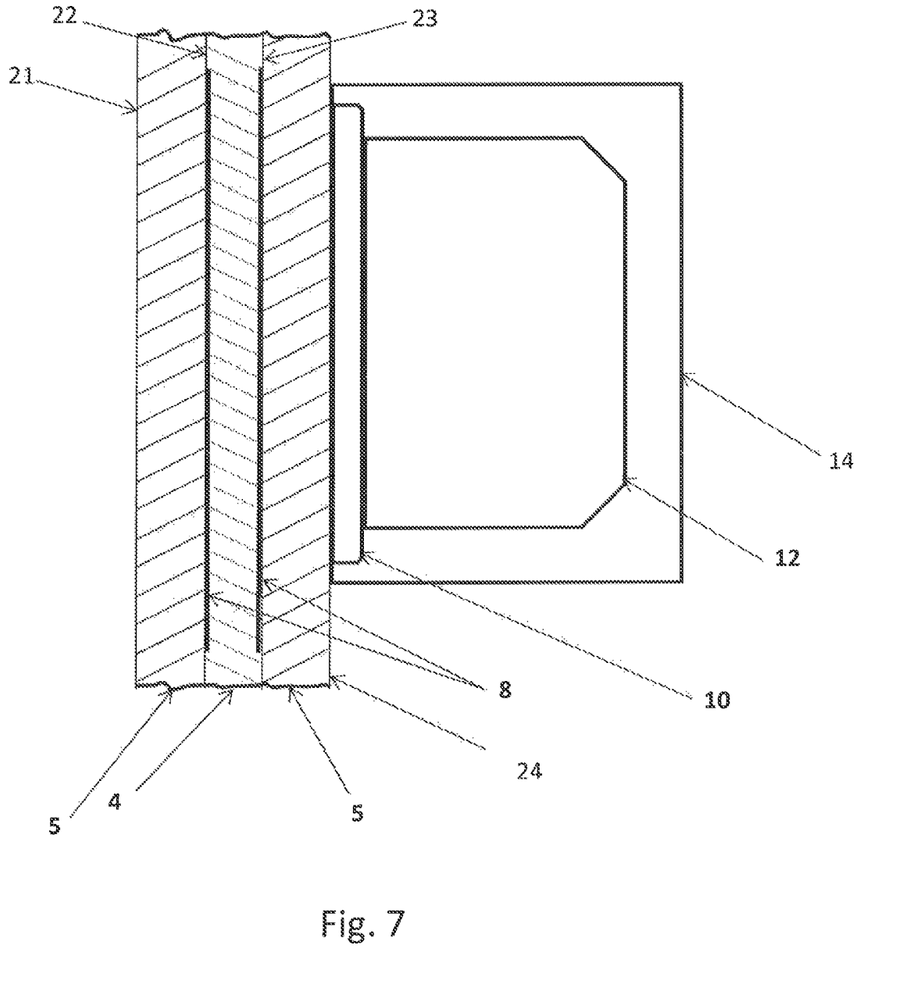
FIG. 7 shows the obscuration 8 printed on both sides of the interlayer 4.

The windshield of FIG. 1 comprising a black enamel frit band 32, a black enamel frit wiper rest area 31 and an equipment obscuration 8, 34 printed on both surfaces of the interlayer (FIG. 7).

Embodiment 3

The windshield of FIG. 1 comprising a wiper rest 31, black band 32 and an equipment obscuration 8, 34 printed on one surface of the interlayer (FIG. 5 and FIG. 6).

Embodiment 4

The windshield of FIG. 1 comprising a wiper rest 31, black band 32 and an equipment obscuration 8, 34 printed on both surfaces of the interlayer (FIG. 7).

Embodiment 5

Figure 8:
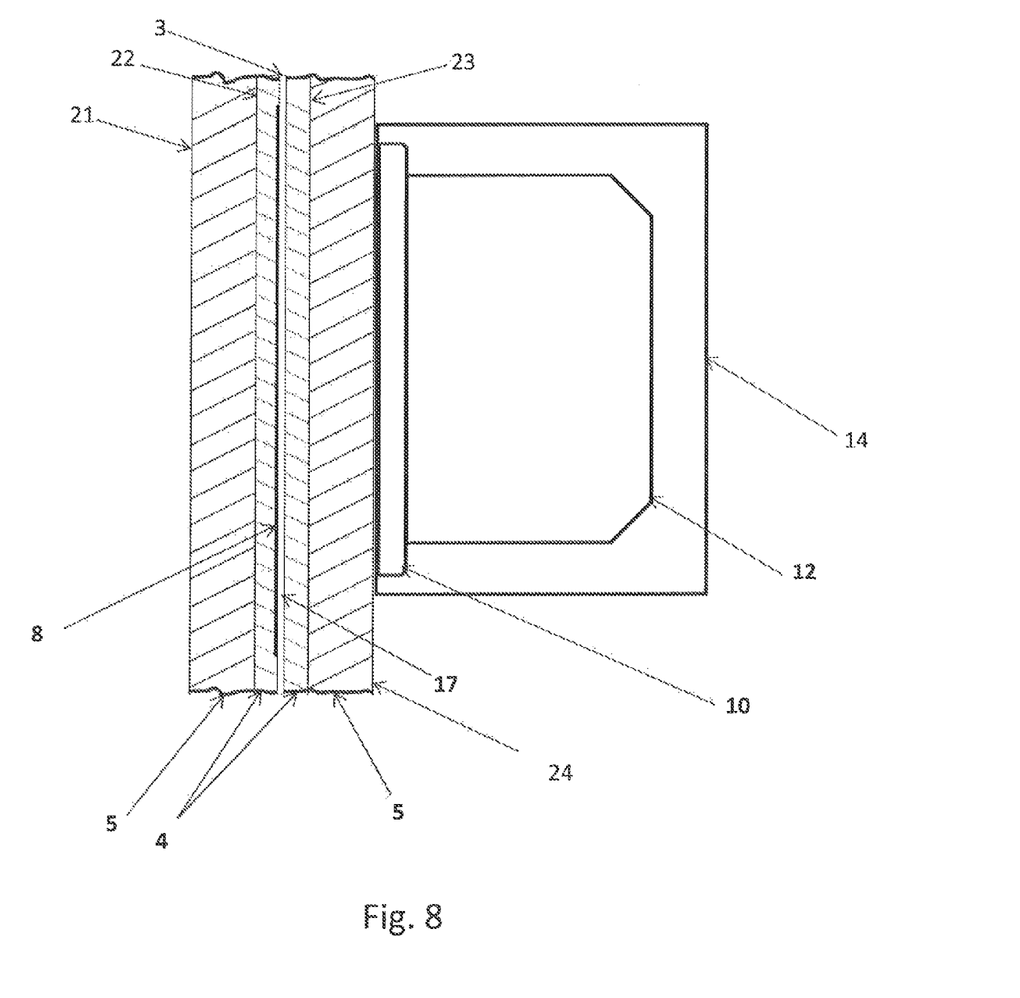
FIG. 8 shows the obscuration 8 printed on a sheet of plastic laminated between two sheets of interlayer 4.

The windshield of FIG. 1 comprising a performance film 17, a wiper rest 31, black band 32 and an equipment obscuration 8, 34 printed on one surface of the interlayer (FIG. 8).

Embodiment 6

Figure 9:
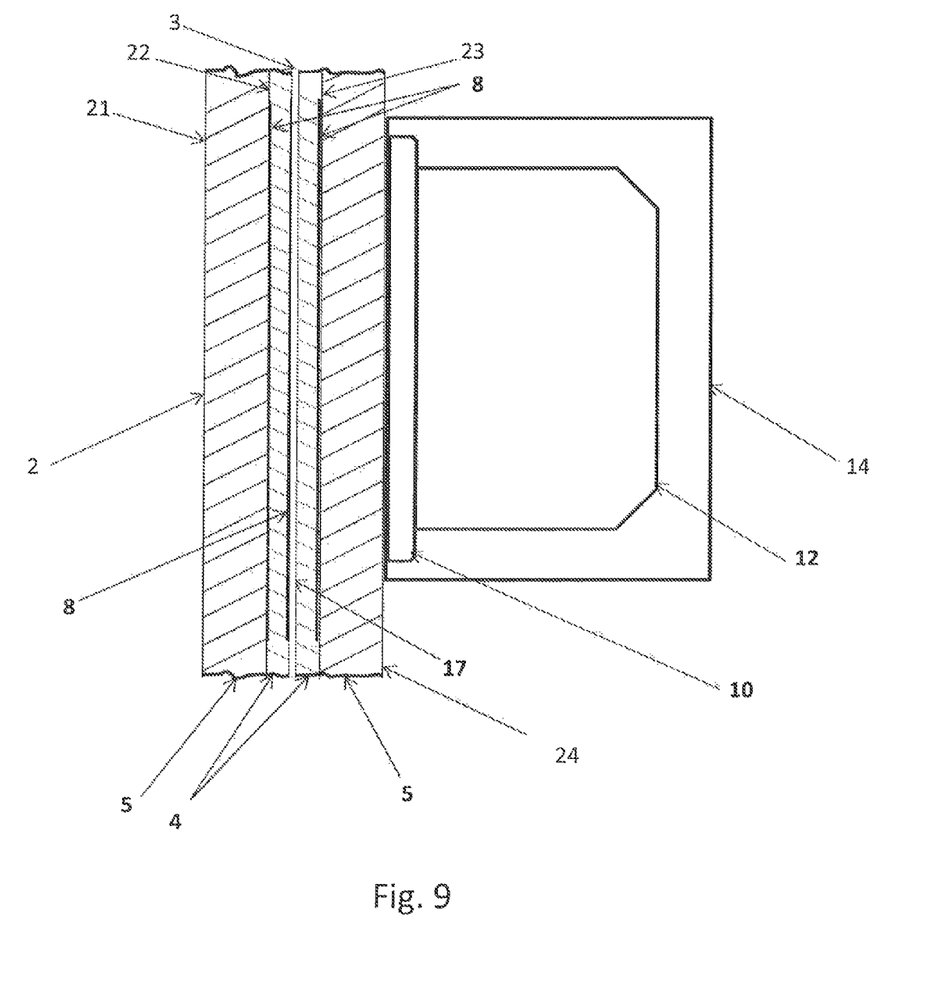
FIG. 9 shows the obscuration 8 printed on a sheet of performance plastic laminated between two sheets of plastic interlayer 4 having an obscuration 8 printed on at least one side.

The windshield of FIG. 1 comprising a performance film 17, a wiper rest 31, black band 32 and an equipment obscuration 8, 34 printed on multiple surfaces (FIG. 9).

Embodiment 7

The obscuration combinations of the previous embodiments, 1-6, further comprising an equipment obscuration separate from the black band and spaced from said black band by at least 3 mm illustrated in FIG. 2.

Embodiment 8

A panoramic windshield (FIG. 3) with the equipment obscuration printed on one surface of the interlayer and an enamel frit wiper rest/black band.

Embodiment 9

A panoramic windshield (FIG. 3) comprising and equipment obscuration printed on both surfaces of the interlayer.

Embodiment 10

A panoramic windshield (FIG. 3) comprising a performance film and an equipment obscuration 8, 34 printed on multiple surfaces (FIG. 9).

Embodiment 11

A panoramic windshield (FIG. 3) comprising and equipment obscuration and a color correction filter printed on the interlayer.

Embodiment 12

A panoramic windshield (FIG. 3) comprising and equipment obscuration printed on both surfaces of the interlayer such that the obscuration is given a three dimensional appearance.

The invention claimed is:

1. A laminated windshield comprising:
   at least two glass layers;
   at least two plastic layers sandwiched between the at least two glass layers, the at least two plastic layers attaching said at least two glass layers to each other;
   at least one obscuration produced by inkjet printing said obscuration onto two surfaces of the at least two plastic layers to produce a three dimensional appearance;
   a UV blocking plastic layer sandwiched between the at least two glass layers; and
   a color correction filter printed directly onto at least one of the at least two plastic layers;
   wherein the laminated windshield has improved fracture strength, reduced distortion and reduced double image.

2. The laminated windshield of claim 1 further comprising an equipment obscuration printed onto at least one of the at least two plastic layers.

3. The laminated windshield of claim 1 further comprising a black band obscuration printed onto at least one of the at least two plastic layers.

4. The laminated windshield of claim 3 further comprising an equipment obscuration separate from and spaced from the black band obscuration.

5. The laminated windshield of claim 1 further comprising a wiper rest obscuration printed onto at least one of the at least two plastic layers.

6. The laminated windshield of claim 1 further comprising at least one performance film plastic layer.

7. The laminated windshield of claim 1, wherein the obscuration is printed on two parallel surfaces of the at least two plastic layers.

8. The laminated windshield of claim 1, wherein at least one performance film plastic layer is sandwiched between the at least two plastic layers.

9. The laminated windshield according to claim 1, wherein the improved fracture strength is about 115 Mpa, the reduced distortion is 25 milli diopters, and the reduced double image is 3" arc minute.

* * * * *